(12) United States Patent
Steuperaert et al.

(10) Patent No.: US 11,910,764 B2
(45) Date of Patent: Feb. 27, 2024

(54) DEVICE FOR INJECTING UNDER THE BARK OF A PLANT

(71) Applicant: CETEV, Le Faget (FR)

(72) Inventors: Jan Steuperaert, Toulouse (FR); Philippe Beuste, Balma (FR); Adeline Renier, Popertuzat (FR)

(73) Assignee: C.E.T.E.V., Le Faget (FR)

( * ) Notice: Subject to any disclaimer, the term of this patent is extended or adjusted under 35 U.S.C. 154(b) by 316 days.

(21) Appl. No.: 17/601,592

(22) PCT Filed: Apr. 9, 2020

(86) PCT No.: PCT/EP2020/060258
§ 371 (c)(1),
(2) Date: Oct. 5, 2021

(87) PCT Pub. No.: WO2020/208189
PCT Pub. Date: Oct. 15, 2020

(65) Prior Publication Data
US 2022/0174884 A1     Jun. 9, 2022

(30) Foreign Application Priority Data

Apr. 9, 2019  (FR) ...................................... 1903762

(51) Int. Cl.
*A01G 7/06*         (2006.01)
(52) U.S. Cl.
CPC ...................................... *A01G 7/06* (2013.01)
(58) Field of Classification Search
CPC .......... A01G 7/06; A01G 29/00; A01G 17/18; A61M 51/1452; A61M 5/172; A61M 2005/14208; A61M 2005/1726
See application file for complete search history.

(56) References Cited

U.S. PATENT DOCUMENTS 7,178,286 B1 *   2/2007   Doolittle ................... A01G 7/06
                                                                47/57.5
8,726,567 B1 *   5/2014   Pishdadian ............... A01G 7/06
                                                                  47/8
(Continued)

FOREIGN PATENT DOCUMENTS

EP          1 205 103            5/2002
EP          1205103 A1  *   5/2002   ............... A01G 7/06
(Continued)

OTHER PUBLICATIONS

International Search Report for PCT/EP2020/060258 dated Jul. 9, 2020, 6 pages.
(Continued)

*Primary Examiner* — Kristen C Hayes
(74) *Attorney, Agent, or Firm* — NIXON & VANDERHYE

(57) ABSTRACT

An apparatus for subcortical injection of a substance into a plant includes a body, a first force sensor measuring bearing force of the apparatus on the plant, a hollow needle to penetrate the plant, a reservoir communicating with the needle and containing the substance, a first actuator moving the needle to insert it into the plant, a second force sensor measuring the force of insertion of the needle, a second actuator compressing the substance in the reservoir, a third actuator measuring pressurization force of the substance, and a microcontroller activating the first actuator only if the first force sensor detects a bearing force, modulating the activation of the first actuator, and thus the injection of the needle into the plant, depending on the measured insertion force, and which modulates compression in the reservoir, and thus injection into the plant, depending on the force measured by the third force sensor.

20 Claims, 4 Drawing Sheets

(56) References Cited

U.S. PATENT DOCUMENTS

| | | | | |
|---|---|---|---|---|
| 2002/0046486 A1* | 4/2002 | Wild | ............... | A01G 7/06 47/57.5 |
| 2010/0258043 A1* | 10/2010 | Dyson-Coope | ........ | A01G 29/00 222/401 |
| 2014/0150337 A1* | 6/2014 | Montecchio | ............. | A01G 7/06 47/57.5 |

FOREIGN PATENT DOCUMENTS

| | | | | |
|---|---|---|---|---|
| EP | 3 189 724 | | 7/2017 | |
| FR | 3 052 634 | | 12/2017 | |
| FR | 3082095 A1 | * | 12/2019 | ............... A01G 7/06 |

OTHER PUBLICATIONS

Written Opinion of the ISA for PCT/EP2020/060258 dated Jul. 9, 2020, 6 pages.

* cited by examiner

DEVICE FOR INJECTING UNDER THE BARK OF A PLANT

This application is the U.S. national phase of International Application No. PCT/EP2020/060258 filed Apr. 9, 2020 which designated the U.S. and claims priority to FR Patent Application No. 19/03762 filed Apr. 9, 2019, the entire contents of each of which are hereby incorporated by reference.

FIELD OF THE INVENTION

The present invention relates to an apparatus for subcortical injection (microinjection) of a substance, preferably a phytosanitary substance, into a plant.

PRIOR ART

In the field of plant treatment, for example in response to insect infestation, bacterial or fungal infection, nutrient deficiency or to correct growth problems, it is known to administer an insecticide, antibiotic, antifungal, nutrient or growth regulator substance.

Such administration can be done according to at least three modes of application:

1) foliar application; which requires thorough foliar coverage and is difficult for large trees. A possible aerial drift causes a poor yield and requires an increased amount of phytosanitary agent and also creates a risk of pollution in the air and/or on neighboring plants.
2) application to the soil; which, due to the diffusion in the soil, requires an increased amount of substance, even if less than in the case of foliar application. This mode also creates a risk of soil pollution.
3) application by injection, wherein the substance is introduced directly into the plant subcortically (under the bark) as close as possible to the xylem, the vascular system of the ascending sap then ensures transport of the substance to the targeted organs from the trunk through the leaves and any fruit. This mode of administration drastically reduces the amount of substance required. The substance is never in contact with the outside environment, which limits the risks of pollution.

Although injection appears to be a particularly interesting solution, it does have several disadvantages.

Thus, access to the xylem is most often achieved by drilling using a drill. The result of such drilling is a large hole and localized heating; they increase the risk of spreading the pathogen (insect, fungus, bacteria, etc.). To mitigate this risk, it is preferable to opt for an additional plugging/dressing operation.

To solve this difficulty, from French patent applications FR 3052634 A1 and FR 3052635 A1 is known a subcortical injection device comprising a body, a substantially rectilinear needle pierced by a channel, a first actuator capable of moving the needle in a centrifugal direction so as to allow it to be introduced into the plant and an injector capable of injecting the substance through the needle via the channel.

While this device provides great satisfaction, its widespread use does remain challenging. Indeed, regular use thereof has shown that the needle insertion and injection forces are extremely variable from one tree to another, which leads to multiple failures.

The operator will feel variations in the insertion force and can sometimes, depending on his/her experience, predict with more or less certainty the success of the following injection.

In a similar way, the operator will be able to feel, during the injection phase, variable force feedbacks and to predict if the injection hole is located in a wooden part suitable for injection or not.

Now, the operator is only subjected to these variations and is not able to adjust the injection.

Finally, more than one in two injections does not proceed satisfactorily. Also, there is no apparatus today that can perform an injection in an industrial way: fast, precise, repeatable, etc.

SUMMARY OF THE INVENTION

The inventors have now succeeded in developing an apparatus for subcortical injection of a substance into a plant which remedies these drawbacks and allows the operator to adapt to this variability so as to obtain an adapted injection whatever the situation.

Thus, the subject matter of the invention is an apparatus for subcortical injection of a substance into a plant which comprises:
  a body (1);
  a substantially rectilinear needle (3) pierced at its center by a channel (4) opening out through at least one hole (2) on the side wall (that is, the periphery) of the needle (3) and therefore not at the end thereof intended to penetrate the plant;
  a reservoir (5) communicating with the needle (3) and containing the substance to be injected;
  a first actuator (6) capable of moving the needle (3) along the axis (AA) of the needle (3) and in a centrifugal direction (DF) so as to allow it to be inserted into the plant;
  a second actuator (7) capable of compressing the volume of substance in the reservoir (5) so as to allow this substance to be injected through the needle (3) to the plant via the channel (4);
characterized in that it further comprises:
  a first force sensor (8) associated with the body (2), which allows the bearing force of the apparatus on the plant to be measured;
  a second force sensor (9) associated with the first actuator (6), which allows the force of insertion of the needle (3) into the plant to be measured following the mobilization thereof by the first actuator (6);
  a third force sensor (10) which allows the pressurization force of the volume of substance in the reservoir (5) to be measured; and
  at least one microcontroller:
    1—which allows the activation of the first actuator (6) only if the first force sensor (8) detects a bearing force;
    2—which then modulates the activation of the first actuator (6), and thus the insertion of the needle (3) into the plant, depending on the insertion force measured by the second force sensor (9); and, simultaneously with or after the insertion has been carried out;
    3—which modulates the compression of the volume of substance in the reservoir (5), and thus the injection of this substance into the plant, depending on the force measured by the third force sensor (10).

The invention also relates to a method of treating a plant by subcortical injection of a substance by means of such an apparatus.

The invention finally relates to the use of such an apparatus for subcortical injection into a plant, preferably for the treatment of a plant by subcortical injection of a phytosanitary substance.

DETAILED DESCRIPTION OF THE INVENTION

The substance to be injected can be of several types and belong to the family of biocides (for example insecticides, antibiotics, antifungals, and/or antiparasitics), nutrients or growth regulators or plant defense stimulators. Now, because of the purpose of the apparatus according to the invention, the substance to be injected will preferably be a phytosanitary substance.

As regards the apparatus itself, it can alternatively take the form of a handheld apparatus or not.

In its non-handheld version, the apparatus can be adapted to a machine (tractor or other) and will then include mechanical, electronic and/or electrical interfaces so as to allow the operation of the apparatus to be controlled by the machine.

Figure 1:
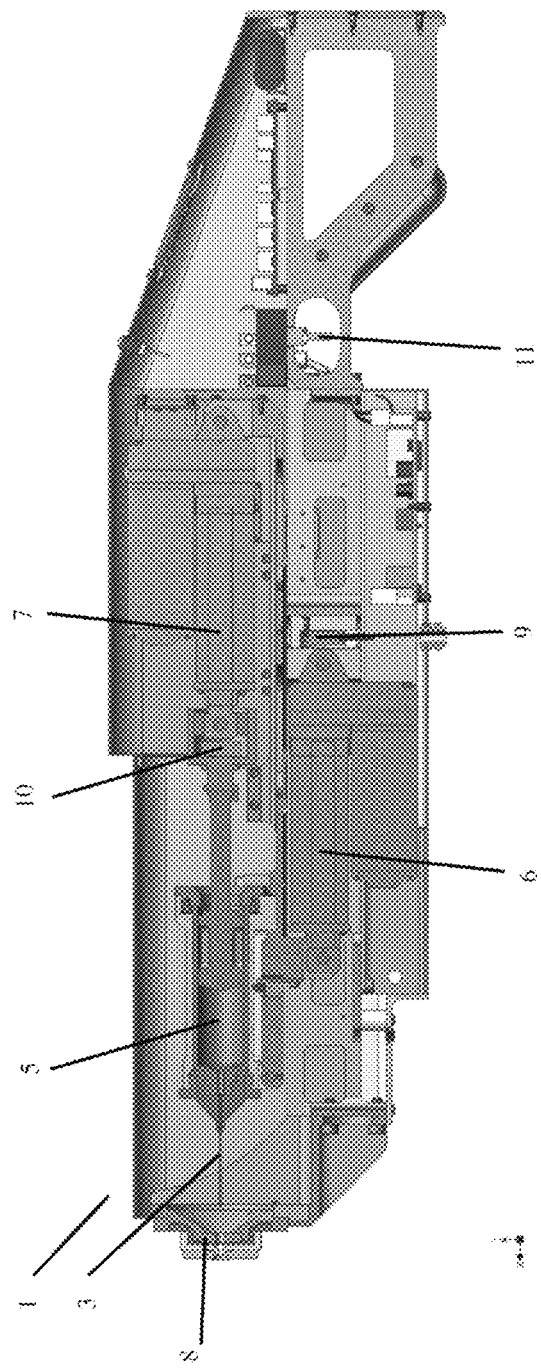
FIG. 1 shows a schematic representation of a preferred embodiment of an apparatus according to the invention.

Now, a portable apparatus, the ergonomics of which will be designed to facilitate its handling by the operator, will be preferred. Such a handheld apparatus is shown in FIG. 1.

Thus, the apparatus will then comprise at least one gripping and guiding means, such as one or two handles, which gripping and guiding means will greatly facilitate handling by the operator. The apparatus may also comprise at least one carrying means, such as a harness or, more simply, a strap so as not to complicate the handling of the apparatus and, above all, not to tire the operator unnecessarily.

As regards the needle, the best possible compromise between ease of injection and the least possible trauma to the bark of the plant should be selected. Typically, the needle will have an average diameter of between 1 and 3 mm, preferably from 1.5 to 2 mm.

As regards the length of the needle, it is between 2 and 20 cm, preferably between 2 and 10 cm, and particularly preferably between 2 and 5 cm. As regards its shape, it can be cylindrical.

As regards the at least one hole (2) on the side wall of the needle and therefore not at the end thereof intended to penetrate the plant, it may be positioned less than one centimeter from this end, or even less than 5 millimeters therefrom.

Now, the needle may have several distal holes forming as many outlets of the channel and that are able to allow the substance to be dispersed in the plant.

The reservoir (5) may be formed by the inner volume of a container (for example a syringe) comprising a first end which forms a tip cooperating with the base of the needle and a second end opposite the first one and through which a piston movable is slidably mounted in translation with respect to the axis of the container, which movable piston is integral with a plunger. Together, the needle (3) and the container form the parts of an injection cartridge which can be renewed after use (injection), simply by replacing the used container with a new pre-filled container.

In connection with the first actuator (6), which allows the needle (3) to be inserted into the plant, this actuator may take the form of a cylinder as much as a striker. It should be noted that this same actuator (6) can also be used to remove the needle (3) from the plant after injection of the substance in the reservoir.

Typically, this first actuator (6) will be dependent on an activation means (11), such as a trigger, which can be operated by the operator. This activation means (11) allows the injection sequence to be triggered and can also be used as a dead man's safety device. In this case, if it is not permanently activated, it will cause the apparatus to shut down.

In connection with the second actuator (7), which allows the substance to be injected, to be injected into the plant, it will ideally take the form of a cylinder. Advantageously, the coupling of the syringe plunger, if any, to the second actuator (7) also allows a backward movement of the syringe plunger, so as to eliminate the residual pressure at the end of the injection and thus eliminate the loss of substance into the environment.

The two actuators can be powered by any known power source, in particular by an electrical and/or pneumatic power source, preferably by an electrical source which can then take the form of a battery, in particular an exchangeable and rechargeable battery pack. Depending on the power and the desired autonomy, the power source may or may not be inside the apparatus (for example a power source carried by the operator).

Now, as regards the force sensors, the first one (8) thereof, which allows the bearing force of the apparatus to be measured, is positioned at a point at which the body (1) bears on the plant and, ideally, in the immediate vicinity of the exit point of the needle (3) for injecting the substance into the plant.

This first force sensor (8) constitutes a safety device since it prevents the injection from being started by activation of the first actuator (6) if this first force sensor (8) does not indicate contact with a bearing surface or if it indicates an insufficient bearing force. Now, this same first force sensor (8) can also interrupt the injection if it detects an interruption in the pressure.

It should be noted that the detection or non-detection of a bearing force may correspond to the detection or non-detection of a bearing force threshold value, which threshold value corresponds to a bearing force of at least 10 daN, preferably of at least 5 daN and, particularly preferably of at least 2 daN.

During the insertion phase of the needle (3), based on the values from the first force sensor (8) and by means of the microcontroller, the operator can be informed of the quality of his/her pressure (for example by means of a gauge displayed on a screen of the apparatus and/or a luminous display (for example LED) which can be positioned at the front of the apparatus and/or an audible signal) so as to be able to adjust his/her gesture when his/her pressure against the plant becomes insufficient and threatens to stop the injection sequence.

The second force sensor (9), associated with the first actuator (6), allows the insertion force of the needle (3) to be measured. In case the insertion force is too great because the area is too hard, there is a risk of damaging the plant, or the needle (3), or even the device. The microcontroller can then interrupt the insertion step to preserve these elements, or even trigger the removal of the needle (3) from the bark of the plant. In the case of an uneventful insertion, the force sensor allows variations in the insertion force to be identified throughout the insertion phase of the needle (3) in the bark and then in the sapwood. The resulting variations are related to the needle (3) passing through the different structures (with different hardness) of the bark and wood of the plant. While the insertion force is constant when crossing a structure, it does vary at the boundary between two structures. Also, monitoring the variations of the insertion force of the needle (3) will allow to inform the operator, and also the apparatus, on the position of the needle (3) within the plant. From there, it becomes possible, by following this variation of the insertion force, to identify the arrival of the needle, or more exactly of at least one hole within it, at the area of the plant most adapted to carry out the injection (for example arrival at the xylem or near it). In this way, the microcontroller is able to interrupt the needle insertion phase as soon as it reaches the targeted plant structure, preferably the xylem, and also to considerably increase the success of the injection.

The apparatus according to the invention may also comprise a first position sensor which is associated with the first actuator (6) and allows to inform the operator, and potentially the apparatus (1), on the length of the needle (3) introduced into the bark of the plant.

Based on the information provided by the first position sensor, the microcontroller is able to interrupt the insertion phase of the needle (3) as soon as the desired length of the needle (3) (or a maximum length) has been inserted into the bark of the plant.

Thus, depending on the plant to be treated, which is indicated by the operator for example, it is possible to modulate the introduced length of the needle. This aspect is particularly interesting as bark thickness can vary considerably from one plant species to another and from one injection point to another on a same plant.

The third force sensor (10) allows the pressurization force of the volume of substance in the reservoir (5) to be measured. This sensor can be associated with the second actuator (7), for example by positioning it between the substance reservoir (and the piston if any) and the second actuator (7), or it can be associated with the substance reservoir (5) so as to directly measure the pressurization of the volume of the substance therein.

In case the pressurization force is too high, for example because the wood area is too hard to be injected, or an injection could damage the plant, or the needle hole (3) is blocked, there is a risk of damaging the reservoir (5) or even the device. In case the pressurization force is too low due to, for example, damage to the bark of the plant, there is a risk of ineffective injection and, above all, of unnecessary dispersion of phytosanitary products into the external environment. In both cases, the microcontroller can interrupt the injection step based on the information transmitted by the second force sensor (9) or the third force sensor (10).

It is also possible to consider pressurizing the substance reservoir (5), then at a constant pressure, during the step of inserting the needle (3) into the bark of the plant. In this case, both actuators (6 and 7) are activated simultaneously by the microcontroller. This "constant" pressurization of the substance reservoir (5) allows to inform the operator, and potentially the apparatus (1), on the arrival of the needle (3) in areas of the plant suitable for injection, since the arrival of the needle (3) in these areas will lead to the activation of the second actuator (7) to maintain the pressure of the substance reservoir (5) constant. From there, it becomes possible, by following this variation of the pressurization force, to identify the arrival of the needle, or more exactly of the at least one hole within it, in the area of the plant most adapted to carry out the injection (for example arrival at the xylem or 1 to 3 cm deeper than it). In this way, the microcontroller is able to interrupt the insertion phase of the needle (3) as soon as it arrives within the targeted plant structure, preferably the xylem or thereafter, and also to considerably increase the success of the injection.

With such a configuration, the needle (3) is first pushed 1 cm below the bark. At this point, the second actuator (7) pressurizes the substance reservoir (5), for example to about 10 bar, which is a so-called detection pressure. The first actuator (6) continues to advance while the second actuator (7) is controlled to maintain this detection pressure, while measuring the volume required to maintain this pressure. When a volume peak is detected while the needle (3) advances, this peak is identified as a suitable location for injection. The insertion and then injection sequence ends at this point.

The apparatus according to the invention may also comprise a second position sensor which is associated with the second actuator (7) and which allows to inform the operator, and potentially the apparatus (1), of the volume of substance introduced into the plant. Based on the information provided by this second position sensor, the microcontroller is able to interrupt the injection phase as soon as the desired volume of substance has been injected into the plant, or to record the volume of substance actually introduced in the event that the injection was interrupted for one of the above-mentioned reasons.

Depending on the plant to be treated, which is indicated by the operator for example, it is possible to modulate the volume of substance injected.

In connection with the microcontroller, the latter includes at least one program which allows the activation of the actuators to be regulated according to the force values measured by the force sensors.

Ideally, the apparatus according to the invention also comprises at least one operating indicator or status indicator, which may take the form of an indicator light such as an LED, and the position of which on the apparatus is such that the operator can see it in any situation. This operating indicator or status light (for example green) informs the operator that an insertion/injection phase is in progress. Now, with the help of another color (for example red), this same operation indicator or status light can inform the operator of the existence of an anomaly, for example an insufficient pressure by the operator of the apparatus against the plant.

The device according to the invention may also comprise one or more visual interfaces (for example LCD screen, LED-type indicator light(s)) allowing the operator to have a visual follow-up of the parameters/data of the current injection sequence. Now, it can also comprise an interface for manually configuring the parameters of the apparatus, including an LCD touch screen with navigation buttons.

Typically, the apparatus according to the invention will comprise at least one screen (for example 2.4" LCD), preferably a touch screen, the position of which is ideally at the base of the apparatus, close to the means of activating the apparatus and therefore to the operator's hands.

Such a screen could, for example, display the various parameters relating to the substance in the reservoir (5)

(name, batch, treatment targeted, volume still contained, etc.) but also data allowing the operator to be assisted in his/her injection (display of the pressure on the trunk, display of a circle identifying the trunk and the injection points to be carried out and those already carried out, in particular the failed points).

Figure 3:
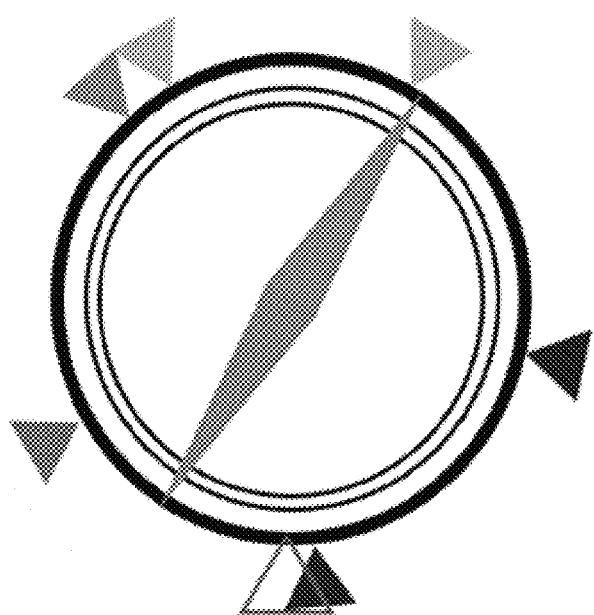
FIG. 3 shows an example of a screen identifying a tree trunk to be injected, the North/South orientation is indicated, as well as the position of the apparatus and the insertion points.

FIG. 3 shows such a display where the circle represents the tree trunk to be injected, its orientation with respect to North and South is indicated by means of the central needles. The empty triangle identifies the position of the apparatus and the other solid triangles the past, present and future insertion sites (a color allows their dissociation).

Such a screen could also allow the operator to enter data (indications of the injection campaign, indication of the tree, indication of the diameter or circumference of the trunk) so as to obtain completed instructions (calculation of the number of injection points to be carried out).

In addition, the apparatus according to the invention will also comprise at least one indicator light, which allows to inform the operator of the status of the apparatus (for example off, on, injection in progress, anomaly). This indicator must remain visible to the operator in positions where reading the display may be compromised. Typically, this indicator light will be positioned at the front end of the device according to the invention where the operator focuses his/her attention during the injection phase.

The device may also comprise one or more internal sensors for indicating the status of one or more components of the apparatus (1), such as the temperature of the actuators or the battery charge level.

The apparatus according to the invention may also comprise one or more environmental sensors allowing the context of the injection to be specified, such as the geographical position (injection site, GPS position), the position of the azimuth of the longitudinal axis of the apparatus (injection direction), or the outside temperature.

As an improvement, the apparatus according to the invention may also comprise an (electronic) memory containing the operating parameters of the apparatus, but also the parameters to be used for the various types of cartridge (number of injection points according to the diameter of the trunk, target volume to be injected, minimum volume for a successful injection, etc.) and, possibly, the history of the injections carried out by the apparatus including the values of all the sensors during the injection (injection campaign, date, place or tree, values of the force and engine parameters during the time of the injection, orientation of the injection, temperature, weather, etc.).

The invention further relates to a method of treating a plant by subcortical injection of a substance, preferably a phytosanitary substance, by means of such an apparatus.

Indeed, the apparatus according to the invention allows the design of elaborate injection sequences where the information from the force sensors influences the insertion/injection sequence. The sequence is controlled by a microcontroller program, which regulates the activation of the actuators according to the force values measured by the force sensors and the desired insertion/injection sequence.

Advantageously, such a method comprises the steps of:
i) Positioning, on the bark of the plant, the treatment apparatus as defined previously and transitioning to step ii) under the control of the first force sensor (8);
ii) inserting, by activation of the first actuator (6), the needle (3) into the bark of the plant under the control of the second force sensor (9), and
iii) injecting, under the bark of the plant, the substance by activation of the second actuator (7) under the control of the third sensor (10).

Figure 2:
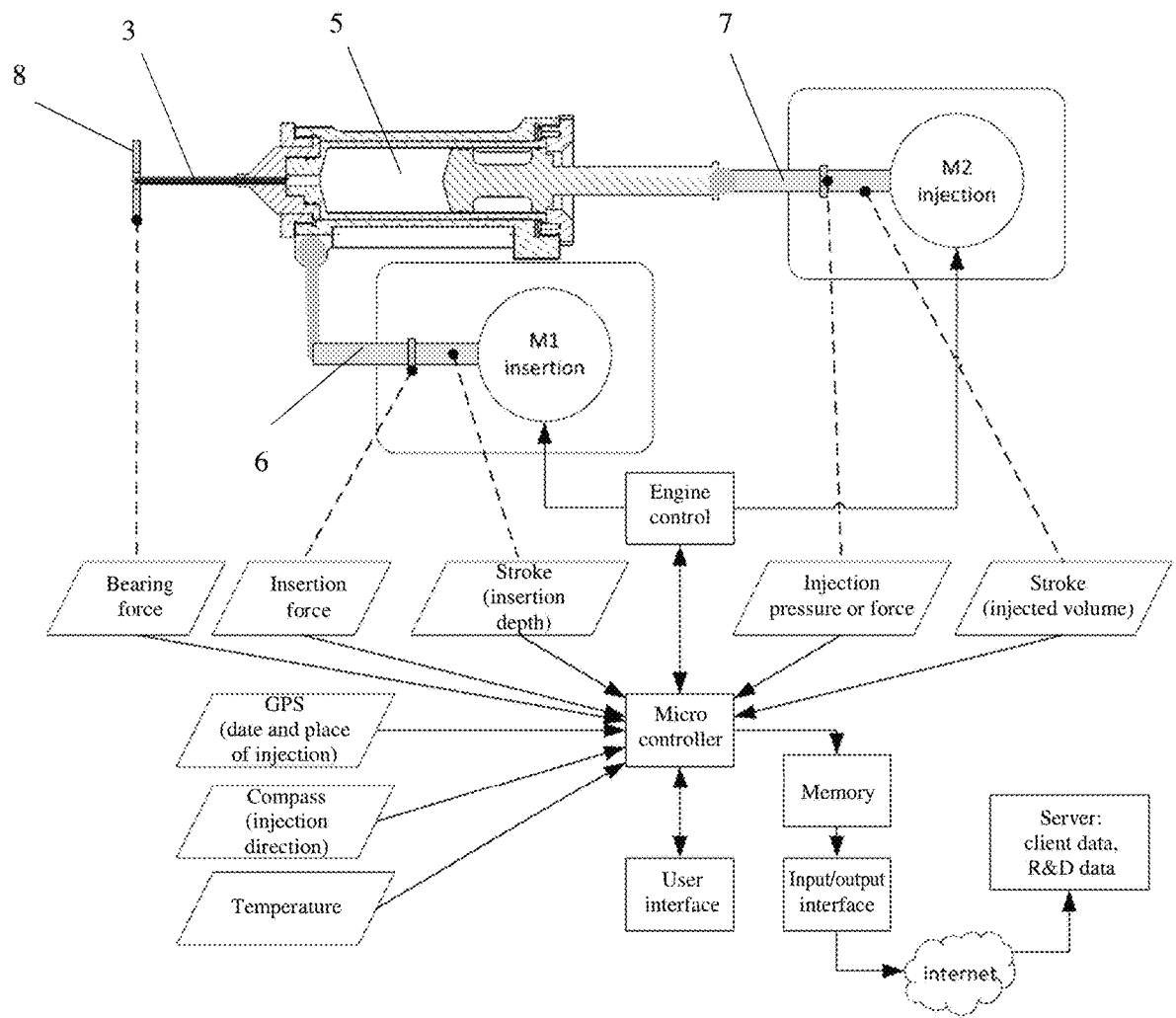
FIG. 2 and following represents a preferred embodiment of the flow chart of an apparatus according to the invention.

A possible schematic diagram organizing the steps of the method is shown in FIG. 2.

The first force sensor (8) controls the transition to step ii) since in the absence of detection of a contact on a bearing surface thereby or in the presence of an insufficient bearing force, the microcontroller prevents the transition to the injection step ii) by activation of the first actuator (6).

Similarly, and following the interruption of the detection of a contact on a bearing surface by the first force sensor (8), the microcontroller (11) interrupts the step ii) of insertion or iii) of injection, either immediately or after a short time allowing the operator to correct the situation without the injection being canceled.

It should be noted that the detection or non-detection of a pressure by the first force sensor (8) may correspond to the detection of a threshold force value, which threshold force value is at least 10 daN, preferably at least 5 daN and, particularly preferably, at least 2 daN.

The control of the second force sensor (9) in the step ii) of inserting the needle into the bark of the plant allows the risks to be limited, both for the injected plant and for the operator.

In case the insertion force is too great, in which case the insertion area can be said to be too hard and the risk of damage to the plant is then significant, the microcontroller interrupts the insertion step ii).

As an example of an insertion force that is too great, a force greater than at least 120 daN, preferably at least 150 daN, can be mentioned.

Similarly, in case the insertion force is too low, in which case the insertion area can be said to be unsuitable with a significant risk of leakage and ineffective injection, the microcontroller also interrupts the insertion step ii).

As an example of an insertion force that is too low, a force of less than at least 10 daN, preferably at least 5 daN, can be mentioned.

Advantageously, the microcontroller interrupts the phase of insertion of the needle (3) as soon as the first position sensor detects the insertion of the desired length of needle (3) in the bark of the plant.

Alternatively, the microcontroller interrupts the insertion phase of the needle (3) as soon as the second force sensor (9) detects it has arrived within a structure of the plant suitable for injection.

Indeed, the second force sensor (9) allows the structure of the plant to be determined by detecting the successive areas of hardness within the bark of the plant, in particular at the tip of the needle (3). It therefore becomes possible to stop the insertion step ii) as soon as the end of the needle (3) has reached the most favorable injection site corresponding either to a given force value or to a position within a given force variation sequence, such as, for example, the area between two peaks of areas requiring a greater insertion force (the entry into the bark not being counted as the first area requiring a greater force).

The control of the third force sensor (9) on the injection step iii), under the bark of the plant, of the substance by activation of the second actuator (7) allows the risks to be limited, whether for the injected plant or for the operator.

In case the injection force is too great, in which case it can be said that the risk of bursting or cracking of the plant bark is then great and/or the risk of bursting and/or leakage of the substance reservoir (5) is too great, the microcontroller interrupts the injection step iii).

As an example of an injection force that is too great, a force greater than at least 60 daN/cm2, preferably at least 50 daN/cm2, can be mentioned.

According to a preferred embodiment, the steps ii) of inserting the needle and iii) of injecting the substance in the reservoir are successive.

According to another preferred embodiment, the steps ii) of inserting the needle and iii) of injecting the substance in the reservoir are simultaneous.

In this case, the second actuator (7) can be activated by the microcontroller in order to achieve "constant" pressurization of the substance container (5).

Therefore, the measurement of the needle insertion depth as well as the flow of liquid necessary to maintain the pressure constant allows the structure of the plant to be determined at the tip of the needle (3), so as to perform the injection at the most favorable site.

Figure 4:
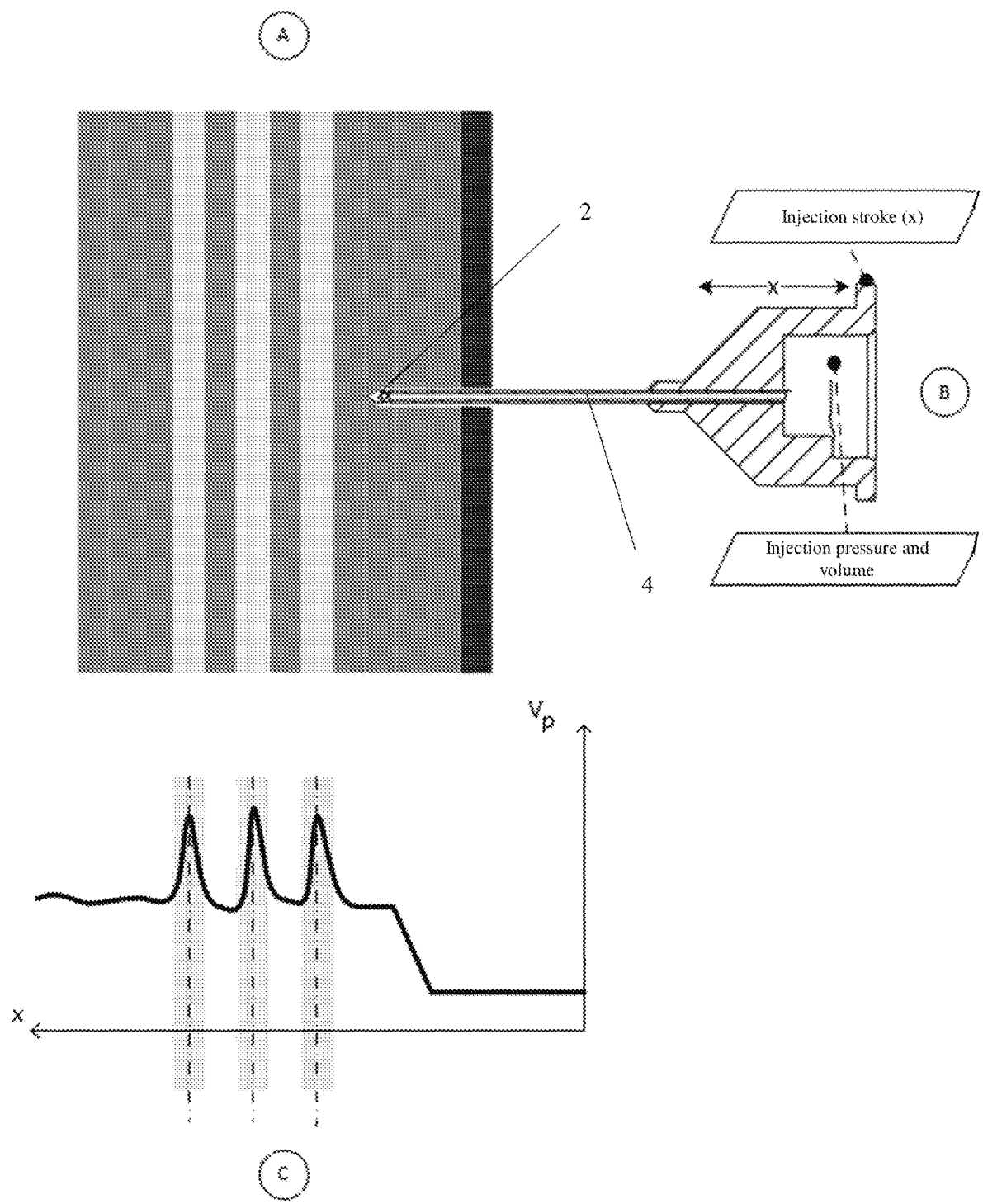
FIG. 4 shows a diagram detailing the correlation between the force variations and the structure of the injected plant.

FIG. 4 illustrates how, starting from the structure of a plant (A), the insertion of the needle (3) therein (B) allows, by means of the third force sensor (9), a schematic representation of this structure to be obtained by representing the variations in volume at a constant pressure (P/V) as a function of the injection stroke (x).

Advantageously, the method according to the invention further comprises a step iv) of extracting the needle (3) by activation of the first actuator (6).

According to a preferred embodiment, the steps iii) of injecting the substance in the reservoir and iv) of extracting the needle are successive.

According to another preferred embodiment, the steps iii) of injecting the substance in the reservoir and iv) of extracting the needle are simultaneous.

Such an embodiment allows the pressure required for injection to be reduced, since the substance occupies the cavity left by the needle and can be absorbed by the plant over time.

The invention further relates to a use of such an apparatus for the treatment of a plant by subcortical injection of a substance, preferably a phytosanitary substance.

The invention claimed is:

1. An apparatus for subcortical injection of a substance into a plant which comprises:
   a body;
   a substantially rectilinear needle pierced at its center by a channel opening out through at least one hole on a side wall of the needle and therefore not at an end thereof intended to penetrate the plant;
   a reservoir communicating with the needle and containing the substance to be injected;
   a first actuator capable of moving the needle along an axis of the needle and in a centrifugal direction so as to allow the needle to be inserted into the plant;
   a second actuator capable of compressing a volume of substance in the reservoir so as to allow this substance to be injected through the needle to the plant via the channel;
   a first force sensor associated with the body, which allows a bearing force of the apparatus on the plant to be measured;
   a second force sensor associated with the first actuator, which allows a force of insertion of the needle into the plant to be measured following mobilization thereof by the first actuator;
   a third force sensor, which allows pressurization force of the volume of substance in the reservoir to be measured; and
   at least one microcontroller:
   1—which allows the activation of the first actuator only if the first force sensor detects a bearing force;
   2—which then modulates the activation of the first actuator, and therefore injection of the needle into the plant, depending on the insertion force measured by the second force sensor and, simultaneously with or after the insertion has been carried out;
   3—which modulates the compression of the volume of substance in the reservoir, and therefore the injection of this substance into the plant, depending on the force measured by the third force sensor.

2. The apparatus according to claim 1, wherein the first actuator is configured to retract the needle in a centrifugal direction from the plant after injection of the substance in the reservoir.

3. The apparatus according to claim 2, wherein the first force sensor is positioned at a point at which the body bears on the plant for the purpose of injecting the substance into the plant.

4. The apparatus according to claim 2, further comprising:
   one or more environmental sensors allowing context of the injection to be specified; and/or
   a memory containing operating parameters of the apparatus, but also parameters to be used for different types of cartridge.

5. The apparatus according to claim 1, wherein the first force sensor is positioned at a point at which the body bears on the plant for the purpose of injecting the substance into the plant.

6. The apparatus according to claim 5, further comprising:
   one or more environmental sensors allowing context of the injection to be specified; and/or
   a memory containing operating parameters of the apparatus, but also parameters to be used for different types of cartridge.

7. The apparatus according to claim 1, further comprising:
   one or more environmental sensors allowing context of the injection to be specified; and/or
   a memory containing operating parameters of the apparatus, but also parameters to be used for different types of cartridge.

8. A method of treating a plant by subcortical injection of a substance, comprising the steps of:
   i) Positioning, on bark of a plant, an apparatus as defined in claim 1, and transitioning to step ii) under control of the first force sensor;
   ii) Inserting, by activation of the first actuator, the needle into the bark of the plant under control of the second force sensor; and
   iii) Injecting, under the bark of the plant, the substance by activation of the second actuator under control of the third force sensor.

9. The method of treating a plant by subcortical injection of a substance according to claim 8, further comprising a step iv) of extracting the needle by activation of the first actuator.

10. The method of treating a plant by subcortical injection of a substance according to claim 9, wherein the steps iii) of injecting the substance in the reservoir and iv) of extracting of the needle are simultaneous.

11. The method of treating a plant by subcortical injection of a substance according to claim 9, wherein the steps of ii) inserting the needle and iii) injecting the substance in the reservoir are successive.

12. The method of treating a plant by subcortical injection of a substance according to claim 9, wherein the steps of ii) inserting the needle and iii) injecting the substance in the reservoir are simultaneous.

13. The method of treating a plant by subcortical injection of a substance according to claim 8, wherein the steps of ii) inserting the needle and iii) injecting the substance in the reservoir are successive.

14. The method of treating a plant by subcortical injection of a substance according to claim 8, wherein the steps of ii) inserting the needle and iii) injecting the substance in the reservoir are simultaneous.

15. The method of treating a plant by subcortical injection of a substance according to claim 14, wherein the second actuator is activated by the microcontroller so as to obtain a constant pressurization of the substance reservoir, and during the insertion step i), arrival of the needle in a zone suitable for injection leads to the activation of the second actuator which, in order to maintain pressure of the substance reservoir constant, completes the step iii) of injecting the substance into the plant.

16. The method of treating a plant by subcortical injection of a substance according to claim 8, wherein the step of ii) inserting the needle is interrupted by the microcontroller when the insertion force is:
   greater than at least 150 daN or
   lower than at least 10 daN.

17. A method for treatment of a plant by subcortical injection of a substance, comprising providing the apparatus of claim 1 having the substance in the reservoir, and applying the apparatus to inject the substance into the plant.

18. A method of treating a plant by subcortical injection of a substance, comprising the steps of:
   i) Positioning, on bark of the plant, an apparatus as defined in claim 2, and transitioning to step ii) under control of the first force sensor;
   ii) Inserting, by activation of the first actuator, the needle into the bark of the plant under control of the second force sensor; and
   iii) Injecting, under the bark of the plant, the substance by activation of the second actuator under control of the third force sensor.

19. A method of treating a plant by subcortical injection of a substance, comprising the steps of:
   i) Positioning, on bark of the plant, an apparatus as defined in claim 5, and transitioning to step ii) under control of the first force sensor;
   ii) Inserting, by activation of the first actuator, the needle into the bark of the plant under control of the second force sensor; and
   iii) Injecting, under the bark of the plant, the substance by activation of the second actuator under control of the third force sensor.

20. A method of treating a plant by subcortical injection of a substance, comprising the steps of:
   i) Positioning, on bark of the plant, an apparatus as defined in claim 7, and transitioning to step ii) under control of the first force sensor;
   ii) Inserting, by activation of the first actuator, the needle into the bark of the plant under control of the second force sensor; and
   iii) Injecting, under the bark of the plant, the substance by activation of the second actuator under control of the third force sensor.

\* \* \* \* \*